United States Patent [19]
Holt

[11] Patent Number: 5,525,989
[45] Date of Patent: Jun. 11, 1996

[54] HELMET AND RADAR DETECTOR INTEGRATION SYSTEM

[76] Inventor: Jody L. Holt, USS Vicksburg CG-69; CF Div., FPO AA, 34093-1189

[21] Appl. No.: 371,992

[22] Filed: Jan. 12, 1995

[51] Int. Cl.⁶ .................... G01S 7/40; A42B 3/04
[52] U.S. Cl. ........................................ 342/20; 345/8
[58] Field of Search ........................ 342/20; 2/422; 455/227; 345/8

[56] References Cited

U.S. PATENT DOCUMENTS

| | | | |
|---|---|---|---|
| 4,719,462 | 1/1988 | Hawkins | 342/20 |
| 5,034,747 | 7/1991 | Donahue | 342/20 |
| 5,095,550 | 3/1992 | Perlinger | 2/422 |
| 5,114,060 | 5/1992 | Boyer | 224/32 R |
| 5,262,930 | 11/1993 | Ichikawa et al. | 345/8 |
| 5,291,203 | 3/1994 | Schneck | 342/20 |

*Primary Examiner*—Daniel T. Pihulic
*Attorney, Agent, or Firm*—Michael I. Kroll

[57] ABSTRACT

A helmet and radar detector integration system comprising a radar laser detector. A structure is for mounting the radar laser detector onto a motorcycle. An impact resistant helmet is worn by a person operating the motorcycle. A component in the helmet is for supporting a light cluster array. The light cluster array when illuminated, can be reflected in the helmet into the eyes of the person. A facility is for electrically coupling the radar laser detector to the light cluster array supporting component. When the radar laser detector illuminates the light cluster array, the person can safely look out through the helmet without anything obstructing vision. The person seeing the reflected light cluster array can still look out through the helmet.

9 Claims, 3 Drawing Sheets

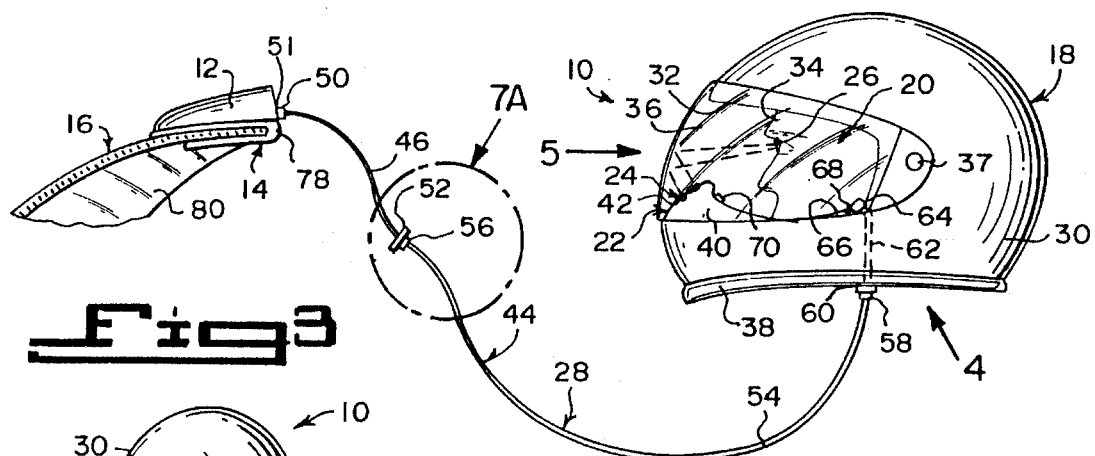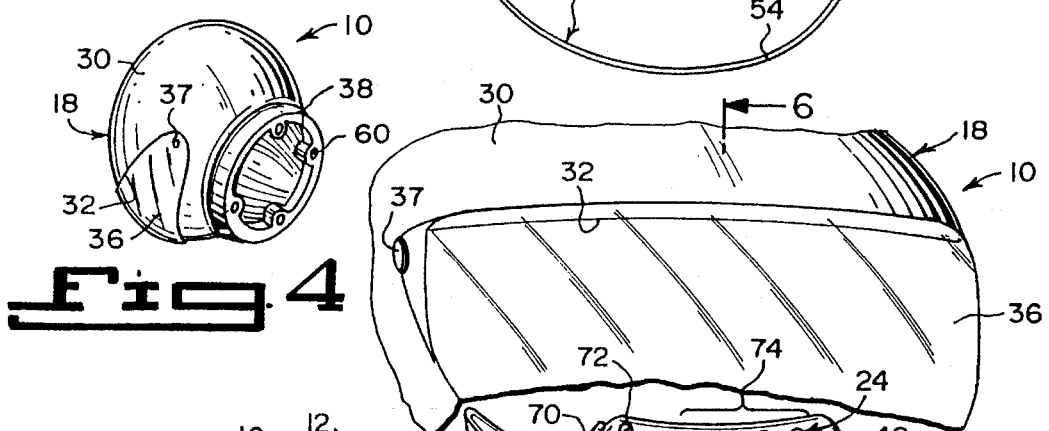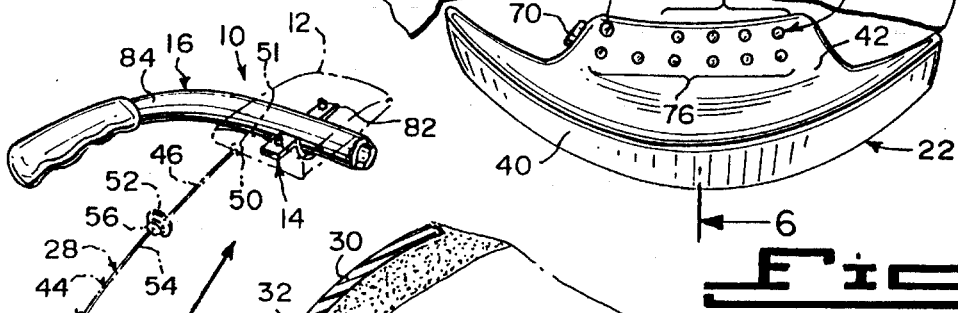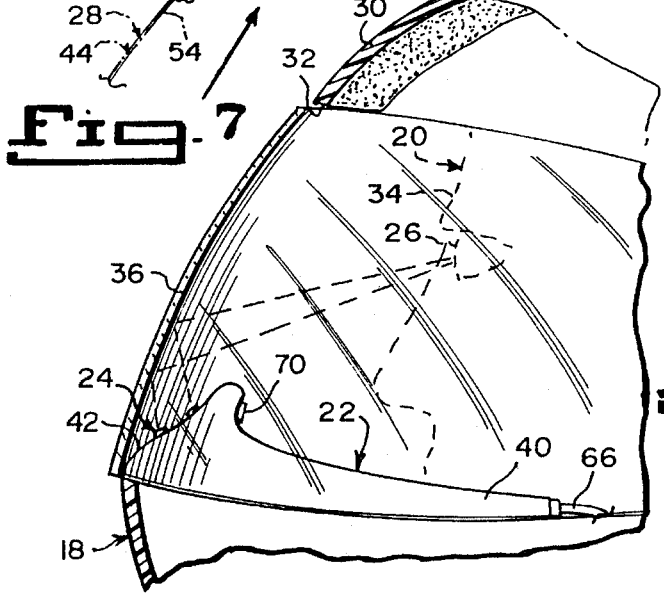

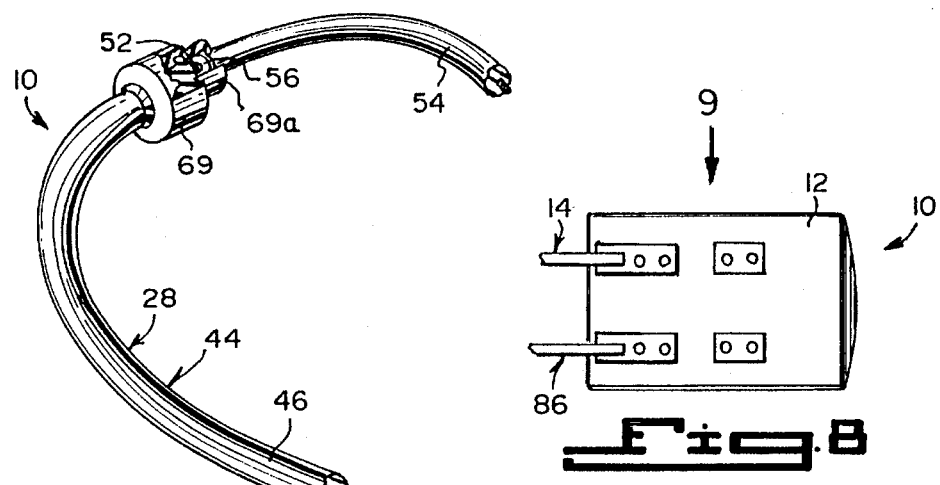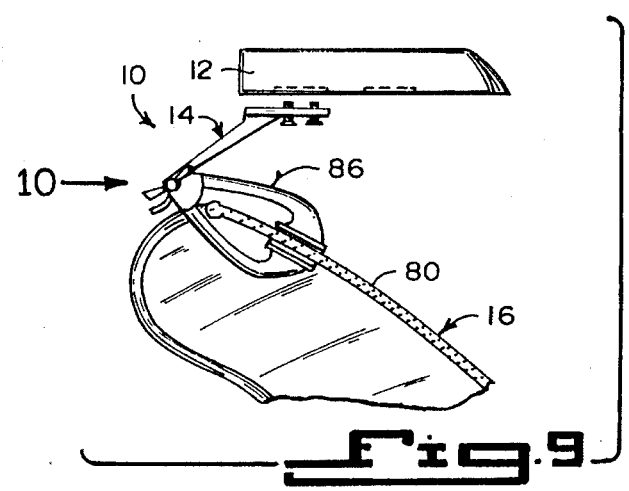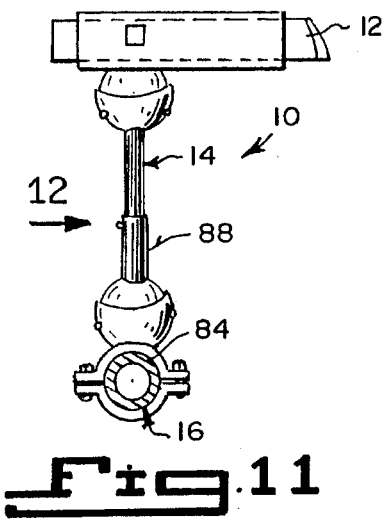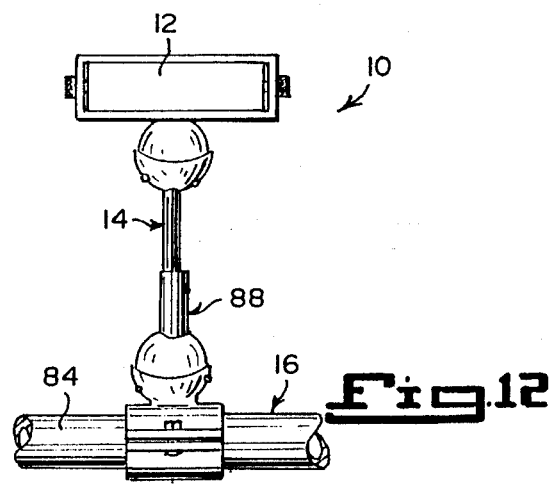

HELMET AND RADAR DETECTOR INTEGRATION SYSTEM

BACKGROUND OF THE INVENTION

1. Field of the Invention

The instant invention relates generally to radar detection devices and more specifically it relates to a helmet and radar detector integration system.

2. Description of the Prior Art

Numerous radar detection devices have been provided in prior art. For example, U.S. Pat. Nos. 4,719,462 to Hawkins; 5,034,747 to Donahue; 5,114,060 to Boyer and 5,291,203 to Schneck all are illustrative of such prior art. While these units may be suitable for the particular purpose to which they address, they would not be as suitable for the purposes of the present invention as heretofore described.

HAWKINS, DAVID E.

RADAR DETECTION HELMET

U.S. Pat. No. 4,719,462

According with the present disclosure to provide a suitable protective headgear for the sports vehicle operator/ motorcyclist that incorporates internal radar detection electronics capable of detecting X and K band radar signals, as well as any future bands that may be used. To provide both audio and visual alarm signals that will allow the operator to adjust speed accordingly to avoid violations. To provide the light panel display in the vision proximity of wearer, so that the operator never has to look away from their immediate trajectory. To provide ventilation for both the wearer and the electronics inclosed therewith that would compensate for any additional heat caused by the electronic circuitry. Helmets would be sized to fit different sized heads with a comfortable snug fit.

DONAHUE, CHRISTOPHER A.

DETACHABLE RADAR UNIT FOR A HELMET

U.S. Pat. No. 5,034,747

A detachable radar unit for a motorcycle unit is presented. An outer shell is permanently attached to the side of a motorcycle helmet. A radar sensing unit may be inserted into the shell, making electrical contact with a microphone and light panel attached to the helmet. The radar sensing unit may also be detached from the helmet and attached to a car or boat by using separate shells permanently mounted on the car or boat. A special quick disconnect plug in the unit's power supply cord is provided which quickly and easily disconnects the helmet from the motorcycle should the need arise.

BOYER, ROBERT

RADAR DETECTOR MOUNTING APPARATUS

U.S. Pat. No. 5,114,060

An apparatus for securely mounting a compact, commercially available radar detector unit on either the handlebars or fairing of a motorcycle. The apparatus provides a sealed chamber, including a shock absorbing manner, for removably receiving the detector unit. When the apparatus is mounted on the motorcycle handlebars, a mounting assembly is provided, which permits the unit to be positioned in various angular orientations. This enables the apparatus to be used on motorcycles with handlebars having widely varying rake angles.

SCHNECK, ERIC H.

RADAR DETECTION HELMET

U.S. Pat. No. 5,291,203

A radar detection helmet is arranged to include radar circuitry, as well as a speaker member, mounted within the helmet. A positionable light-emitting diode housing is arranged in the helmet, for ease of positioning and observation of the light-emitting diode in use of the radar detection apparatus.

SUMMARY OF THE INVENTION

A primary object of the present invention is to provide a helmet and radar detector integration system that will overcome the shortcomings of the prior art devices.

Another object is to provide a helmet and radar detector integration system that will bring the light cluster array and speaker from the radar laser detector directly into a helmet on a nose piece, so as to always alert a person wearing the helmet.

An additional object is to provide a helmet and radar detector integration system, in which the light cluster array on the nose piece are reflected off of the inside surface of a closed face shield of the helmet, so that the person wearing the helmet can safely look out through the face shield without anything obstructing vision, since the person sees a reflected light cluster array and still look through the face shield.

A further object is to provide a helmet and radar detector integration system that is simple and easy to install, whereby removal and storage is quick and simple, while a fully adjustable setup is available to fit all types of motorcycles.

A still further object is to provide a helmet and radar detector integration system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a side elevational view taken in the direction of arrow 3 in FIG. 1, with parts broken away.

FIG. 4 is a bottom perspective view of the helmet per se taken in the direction of arrow 4 in FIG. 3, showing the locations of four female connectors.

FIG. 5 is a front perspective view of the helmet taken in the direction of arrow 5 in FIG. 3 with parts broken away, showing the light cluster array on the nose piece.

FIG. 6 is a cross sectional view generally along line 6—6 in FIG. 5.

FIG. 7 is a perspective view of a portion of the handlebar showing a bracket for mounting the radar laser detector, which is in phantom, directly onto the handlebar, if the motorcycle has no windshield.

FIG. 7A is an enlarged perspective view with parts broken away, of a portion of the cable assembly as indicated by arrow 7A in FIG. 3, showing the waterproof rubber casings thereon.

FIG. 8 is a bottom view of the radar laser detector with a portion of a fully adjustable windshield bracket connected thereto.

FIG. 9 is a side view taken in the direction of arrow 9 in FIG. 8, showing the fully adjustable windshield bracket connected to the windshield of the motorcycle.

FIG. 10 is a rear view taken in the direction of arrow 10 in FIG. 9.

FIG. 11 is a side view of a fully adjustable handlebar bracket connecting the radar laser detector onto the handlebar of the motorcycle.

FIG. 12 is a rear view taken in the direction of arrow 12 in FIG. 11.

DETAILED DESCRIPTION OF THE PREFERRED EMBODIMENTS

Figure 1:
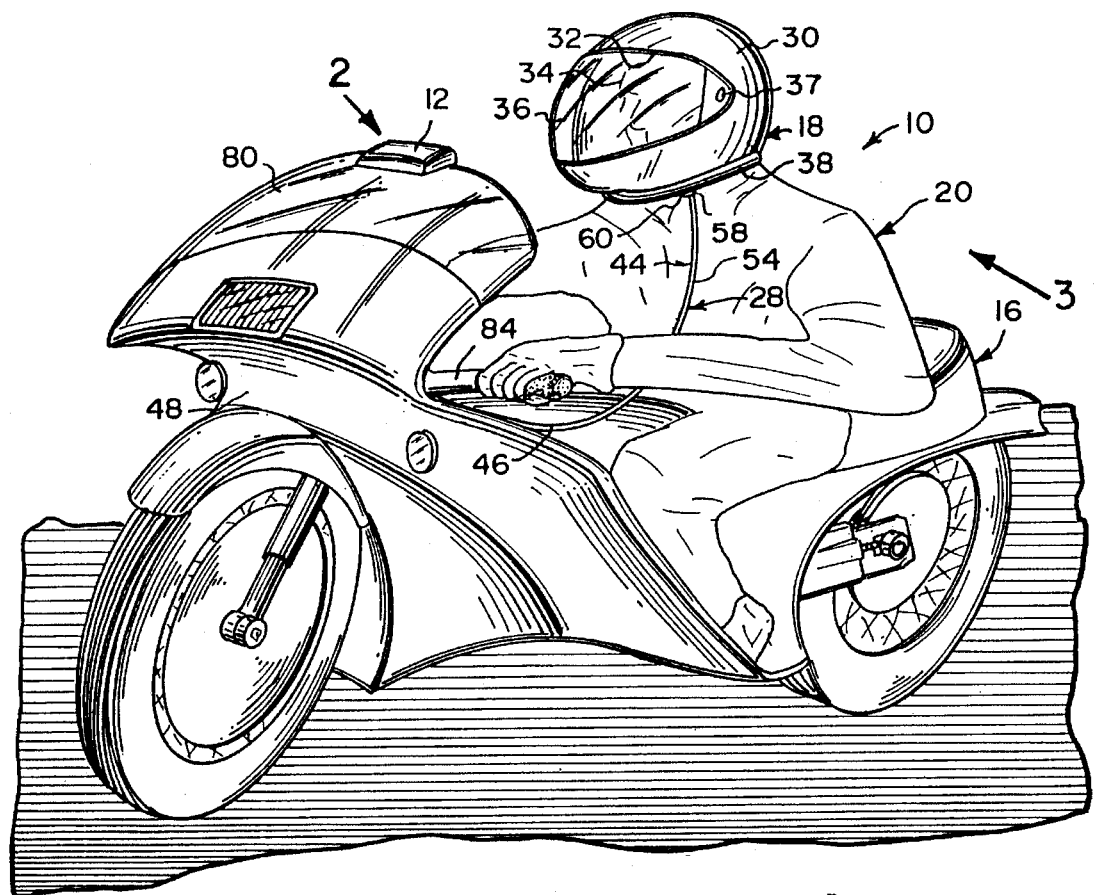
FIG. 1 is a perspective view of a motorcycle with the instant invention in use.

Turning now descriptively to the drawings, in which similar reference characters denote similar elements throughout the several views, FIGS. 1 through 12 illustrate a helmet and radar detector integration system 10, comprising a radar laser detector 12. A structure 14 is for mounting the radar laser detector 12 onto a motorcycle 16. An impact resistant helmet 18 is worn by a person 20 operating the motorcycle 16. A component 22 in the helmet 18 is for supporting a light cluster array 24. The light cluster array 24 when illuminated, can be reflected in the helmet 18 into the eyes 26 of the person 20. A facility 28 is for electrically coupling the radar laser detector 12 to the light cluster array supporting component 22. When the radar laser detector 12 illuminates the light cluster array 24, the person 20 can safely look out through the helmet 18 without anything obstructing vision. The person 20 seeing the reflected light cluster array 24 can still look out through the helmet 18.

The helmet 18 consists of a rigid dome-shaped shell 30, having a forward face opening 32. The shell 30 fits over the head 34 of the person 20. A transparent face shield 36 is pivotally mounted at 37 to the shell 30, so as to cover the forward face opening 32 in which the light cluster array 24 is reflected therefrom. A neck sock 38 is on a peripheral edge of the shell 30. The supporting component 22 is a nose piece 40, having a forward end 42 angled rearwardly. The light cluster array 24 is on the forward end 42, to be reflected off of the face shield 36.

The electrically coupling facility 28 is an elongated cable assembly 44 extending between the radar laser detector 12 and the nose piece 40. The elongated cable assembly 44 includes a first cable 46 which can be permanently installed within the framework 48 of the motorcycle 16. A first plug 50 is on a first end of the first cable 46, to plug into a first jack 51 in the radar laser detector 12. A second jack 52 on a second end of the first cable 46 can be mounted in a convenient place in the framework 48 of the motorcycle 16.

A second cable 54 is also provided. A second plug 56 on a first end of the second cable 54 plugs into the second jack 52 on the framework 48 of the motorcycle 16. A third plug 58 is also on a second end of the second cable 54. A plurality of spaced apart helmet jacks 60 are located on the neck sock 38 of the helmet 18. The third plug 58 on the second end of the second cable 54 can plug into any one of the helmet jacks 60. Permanent wiring 62 extends from the helmet jacks 60 on the neck sock 38 within the helmet 18. An internal jack 64 within the helmet 18 is electrically connected to the permanent wiring 62 in the helmet 18. A power cable 66 extends from the nose piece 40. An internal plug 68 on a distal end of the power cable 66 plugs into the internal jack 64 within the helmet 18. As shown in FIG. 7A, a first waterproof rubber casing 69 is about the second jack 52 to prevent corrosion.

A small high decibel speaker 70 in the nose piece 40 is activated by the radar laser detector 12 to be heard by the person 20. The light cluster array 24 consists of a green light emitting diode 72 indicating power is on. Four light emitting diodes 74 are for showing three radar bands and a laser and six light emitting diodes signal intensity lights 76 are also provided, being two yellow, two orange and two red. The light cluster array 24, shown in FIG. 5, is just a setup recommendation. Manufacturing may cause variations and deviations from this setup.

Figure 2:
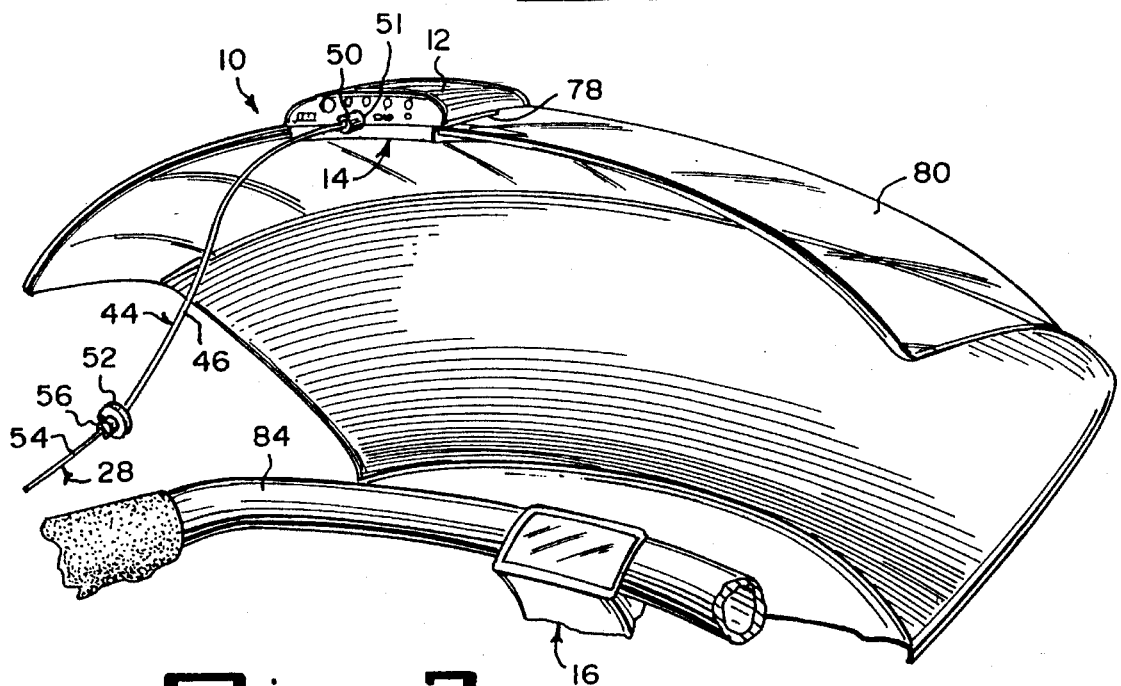
FIG. 2 is a perspective view taken in the direction of arrow 2 in FIG. 1, with parts broken away.

The mounting structure 14, as best seen in FIGS. 2 and 3, is a spring clip bracket 78 for holding the radar laser detector 12 onto a windshield 80 of the motorcycle 16. The mounting structure 14, as shown in FIG. 7, can also be a clamp bracket 82 for holding the radar laser detector 12 onto a handlebar 84 of the motorcycle 16.

The mounting structure 14, as shown in FIGS. 8, 9 and 10, is a fully adjustable windshield bracket 86 for holding the radar laser detector 12 onto the windshield 80 of the motorcycle. The mounting structure 14, shown in FIGS. 10 and 11, is a fully adjustable handlebar bracket 88, for holding the radar laser detector 12 onto the handlebar 874 of the motorcycle 16.

LIST OF REFERENCE NUMBERS 10 helmet and radar detector integration system
12 radar laser detector
14 mounting structure
16 motorcycle
18 impact resistant helmet
20 person
22 supporting component
24 light cluster array
26 eye of 20
28 electrically coupling facility
30 rigid dome-shaped shell of 18
32 forward face opening in 30
34 head of 20
36 transparent face shield
37 pivot of 36, 30
38 neck sock on 30
40 nose piece for 22
42 forward end of 40
44 elongated cable assembly for 28
46 first cable
48 framework of 16
50 first plug on 46
51 first jack in 12
52 second jack on 46
54 second cable
56 second plug on 54
58 third plug on 54

60 helmet jack on 38
62 permanent wiring in 18
64 internal jack on 62 in 18
66 power cable on 40
68 internal plug on 66
70 small high decibel speaker in 40
72 green light emitting diode
74 light emitting diode
76 light emitting diode intensity light
78 spring clip bracket for 14
80 windshield of 16
82 clamp bracket for 14
84 handlebar of 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A helmet and radar detector integration system comprising:
    a) a radar laser detector;
    b) means for mounting said radar laser detector onto a motorcycle;
    c) an impact resistant helmet worn by a person operating the motorcycle comprising a rigid dome-shaped shell having a forward face opening and transparent face shield means pivotally mounted on said shell to cover in the closed position said forward face opening and a neck sock on a peripheral edge of said shell, said neck sock having a plurality of spaced apart helmet jacks;
    d) means in said helmet for supporting a light cluster array, so that said light cluster array when illuminated, is reflected in said helmet off said face shield into the eyes of the person, said supporting means including a nose piece having a forward end angled rearwardly with said light cluster array on the forward end;
    e) means comprising an elongated cable assembly extending between said radar laser detector and said nose piece for electrically coupling said radar laser detector to said light cluster array supporting means, so that when said radar laser detector illuminates said light cluster array, the person can safely look out through said helmet without anything obstructing vision, since the person seeing said reflected light cluster array can still look out through said helmet, said elongated cable assembly having a plug at one end to plug into a jack on said radar laser detector and a plug at the other end to plug into any one of said helmet jacks in said neck sock, all of said helmet jacks being connected to said light cluster array;
    f) speaker means mounted in said nose piece activated by said radar laser detector to be heard by said person; and
    g) said light cluster array including a green power on light emitting diode indicating power is on, four light emitting diodes showing three radar bands and a laser, and six light emitting diodes being two yellow, two orange, and two red.

2. A helmet and radar detector integration system as recited in claim 1, wherein said elongated cable assembly includes:
    a) a first cable which can be permanently installed within the framework of the motorcycle;
    b) a first plug on a first end of said first cable to plug into a first jack in said radar laser detector; and
    c) a second jack on a second end of said first cable can be mounted in a convenient place in the framework of the motorcycle.

3. A helmet and radar detector integration system as recited in claim 2, wherein said elongated cable assembly further includes:
    a) a second cable;
    b) a second plug on a first end of said second cable to plug into said second jack on the framework of the motorcycle;
    c) a third plug on a second end of said second cable; and
    d) a plurality of spaced apart helmet jacks on said neck sock of said helmet, so that said second plug on the second end of said second cable can plug into any one of said helmet jacks.

4. A helmet and radar detector integration system as recited in claim 3, wherein said elongated cable assembly further includes:
    a) permanent wiring extending from said helmet jacks on said neck sock within said helmet;
    b) an internal jack within said helmet electrically connected to said permanent wiring in said helmet;
    c) a power cable extending from said nose piece; and
    d) an internal plug on a distal end of said power cable to plug into said internal jack within said helmet.

5. A helmet and radar detector integration system as recited in claim 4, wherein said elongated cable assembly further includes:
    a) a first waterproof rubber casing about said second jack to prevent corrosion; and
    b) a second waterproof rubber casing about said second plug to prevent corrosion.

6. A helmet and radar detector integration system as recited in claim 5, wherein said mounting means includes a spring clip bracket for holding said radar laser detector onto a windshield of the motorcycle.

7. A helmet and radar detector integration system as recited in claim 5, wherein said mounting means includes a clamp bracket for holding said radar laser detector onto a handlebar of the motorcycle.

8. A helmet and radar detector integration system as recited in claim 5, wherein said mounting means includes a fully adjustable windshield bracket for holding said radar laser detector onto a windshield of the motorcycle.

9. A helmet and radar detector integration system as recited in claim 5, wherein said mounting means includes a fully adjustable handlebar bracket for holding said radar laser detector onto a handlebar of the motorcycle.

* * * * *